Jan. 17, 1933. J. CARR 1,894,607
CARBURATION APPARATUS
Filed Sept. 12, 1927

Inventor
John Carr
By C.F. Heinkel, Attorney

Patented Jan. 17, 1933

1,894,607

UNITED STATES PATENT OFFICE

JOHN CARR, OF CLEVELAND, OHIO; GEORGE H. FORRLER, EXECUTOR OF JOHN CARR, DECEASED

CARBURATION APPARATUS

Application filed September 12, 1927. Serial No. 219,014.

My invention relates to apparatuses and devices in which two or more substances or carburation materials are combined in the nature of carburation to form a final substance or mixture.

One of the objects of my invention is a simple, inexpensive, easily operable, efficient, and safe apparatus to effect carburation in the most economical manner; to make the apparatus in duplicate units or elements and use commercial stock as far as possible to reduce the cost thereof; to provide adequate safety means to avoid overflow of liquid and overproduction of mixture and of pressure; to avoid the collection of sediment and to convert all of the carburation liquid into a component of the resulting mixture; to feed just sufficient carburation liquid into the carburation elements of the apparatus to meet the immediate requirements of the same; to suspend the liquid in the carburation elements and to avoid the formation of a body of liquid in the carburation elements; to provide adequate adjustment to vary the proportion of the carburation materials in each of the carburation elements to vary the resultant mixture at will; and to make the entire apparatus entirely automatic in operation so that the same requires the least amount of attention. Other objects will appear, or become apparent or obvious, or will suggest themselves during the description herein.

One feature of my invention is to provide a baffle means in the carburation element or elements, preferably a porous mass such as gravel or slag, and to feed the carburation liquid onto the top of this mass and only in such quantities as are actually required for immediate carburation use in the element and to let this liquid trickle downwardly and through the mass to be absorbed by the carburation gas as it comes up from the bottom of the element; the liquid travels in one direction while the gas travels in the opposite direction; this opposing movement, aided by the tortuous path of the liquid and of the gas through the baffle means, converts all of the liquid into a component of the resulting mixture. This arrangement and operation leaves no residue in the element since there is no body of liquid therein from which a residue could form. Due to the fact that my invention uses up all of the liquid in the formation of the mixture, the cost of the mixture is materially reduced and, due to the adjustability which I provide, a means to vary the relative proportions of the component parts of the mixture is attained and, due to the automatic features which I provide, the apparatus is operable with the least amount of attention.

In order to illustrate my invention, I have selected a certain type of apparatus and have shown the same in the accompanying drawing and describe the same in this specification as containing the features of my invention, but such showing and description shall not limit my invention to such showing and description since I am aware that my invention is applicable to apparatuses other than the one shown and described and that various changes can be made in the structure of the elements of the apparatus as well as in the arrangement thereof.

In the accompanying drawing:—Fig. 1 is a general perspective view of a carburation apparatus embodying the features of my invention and shows the apparatus as completely closed and the pressure gauges and the electric switch visible on the outside of the front thereof and a mixture outlet extending from one end thereof and a liquid and gas tube extending from the other end thereof.

Similar reference characters refer to similar parts throughout the views.

Figures 1, 2, 3, 4:
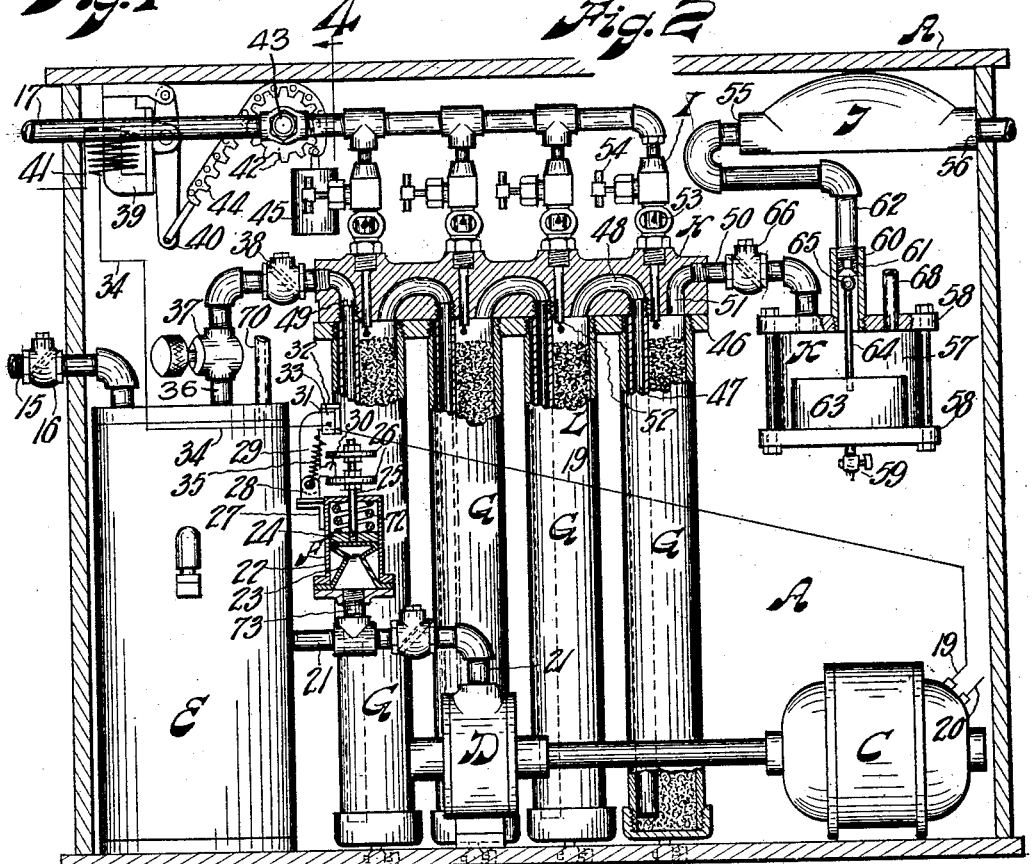
Fig. 2 is a vertical section through the liquid receptacle and shows a manner of feeding liquid into the carburation elements of Fig. 1.
Fig. 3 is a vertical section through the apparatus shown in Fig. 1 and shows the structure and the arrangement of the interior elements more clearly.
Fig. 4 is a traverse section, also vertical, of a portion of the apparatus, the section being taken in a vertical plane indicated by the line 4 in Fig. 3 and shows more clearly the relations between the electro-magnet and the shut off valve in the liquid feed tube.

The apparatus shown in the accompanying drawing is adapted to produce a gas mixture formed of gasolene and air, a liquid and a gas, and is described herein as using these components. I am aware, however, that other substances can be used in this particular apparatus and that modifications can be made in the apparatus shown and described to use still other substances, within the scope of the appended claims.

A feature of my invention is to arrange the elements in such a manner that they can conveniently be inclosed in the cabinet A having the doors 10 and the lock 11 thereon so that tampering with the elements is minimized and the apparatus as a whole presents a neat and pleasing appearance.

The gasolene storage receptacle B may be located at any convenient place and has the end 12 of the T 13 threaded into the top thereof (Fig. 2); the bushing 14 is inserted into one of the outlets of the T. One end of the tube 15 is threaded into another one of the outlets of the T and the other end extends into the cabinet to connect with elements therein as will be explained presently. The check valve 16 is inserted into the tube 15 in such a manner that air can flow from the apparatus and into the receptacle B but can not flow from the receptacle B back into the apparatus through the tube 15. The tube 17 extends through the bushing 14 and down into the receptacle B to nearly the bottom thereof where it has the screen 18 and upwardly and over and into the cabinet to connect with elements therein as will be explained presently.

In the present instance, the power means to operate the apparatus is the electric motor C which has the leads 19 and 20 and operates the air pump D which has the discharge tube 21.

The air storage receptacle E is placed in the cabinet at one side and has the tube 21 threaded into the same to feed air into the same from the pump.

The electric cut out element F is inserted into the tube 21 and comprises the case 22, the collapsible cup 23 therein, the washer 24 therein and abutting the end of the cup, the rod 25 threaded into the washer and extending through the top of the case, and the spaced electrically insulating fiber washers 26 on the upper end of the rod. The arm 27 extends from the case 22 and carries the electrically insulated bracket 28 on which the switch arm 29 is pivoted. The arm 30 extends between the washers 26 and the knife blade 31 extends between the contact blades 32 and 33 similar to knife switches. The lead 19 from the motor is secured to the blade 33 and the lead 34 is secured to the blade 32. The spring 35 is arranged for quick make and break as is usual in such switches.

The tube 15 is threaded into the top of the receptacle E and thereby establishes communication between the receptacles B and E.

The tube 36 is threaded into the top of the receptacle E, has the selectively adjustable pressure reducing valve 37 inserted therein to selectively vary the pressure of the air flowing from the tube 36 to any desired degree in relation to the pressure in the receptacle E, and also has the check valve 38 inserted therein to prevent the flow of substance from the tube 36 back into the receptacle E, and extends to the elements G which will be described presently.

The electro-magnet 39 has the lever 40 pivoted thereon and hinged to the armature thereof. The coil on the electro-magnet has the lead 41 connected to one of the power lines and the lead 34 leading to the contact blade 32. The lead 20 connects with the other power line. The sprocket 42 is secured to the rotating member of the shut off cock 43 which is inserted in the tube 17 which extends from the receptacle B and into the cabinet and traversely of the elements G. The sprocket chain 44 engages the teeth of the sprocket and has one end thereof fastened to the lower end of the lever 40 and the weight 45 on the other end thereof.

The cock 43 controls the flow of liquid through the pipe 17 in the usual manner of such devices so that rotation of the rotative part thereof increases or decreases the flow.

In the device shown adjustment or regulation of the cock is made by shifting the chain 44 from one set of the teeth on the sprocket 42 whereupon the sprocket and the rotatable part of the cock thereon can be rotated according to adjustment desired so that a desired quantity of liquid will flow therethrough for desired carburation.

The elements or containers G, four in the present instance, are formed of long and cross-sectionally small tubular members each having the lower end thereof closed by a cap and drain valves therein. At the top, each of the members G is threaded into the plate 46 in spaced relation with each other. The head H abuts the plate 46 and has the four tubes 47, threaded therein in spaced relation with each other and with the elements G and also has the three channels 48 leading from the threaded end of the last three tubes 47 and opening into the next forward ones of the elements G. The tube 36 is threaded into the inlet channel 49 and the tube 50 is threaded into the outlet channel 51. The head H also has the liquid feed tubes 52 extending a short distance down below the bottom of the head so that the gasolene will drop off freely and is located substantially central so that the liquid in evenly distributed.

Each of the four adjustable sight feed elements I has the lower end thereof threaded in to the head H opposite the tubes 52 and has the glass portion 53 so that the quantity of liquid feed can be seen and also has the handle 54 by means of which the quantity of liquid feed can be regulated selectively. The top of each of the elements I is tubularly connected with the tube 17.

The pressure reducing element J, of any usual or special structure, is mounted in the cabinet and has the inlet 55 and the outlet 56 which may be connected to any suitable mixture consuming means.

The safety element K has the glass tube 57 closed at both ends by the flanges 58. The faucet 59 affords a drainage for the element K. The tube 60 is threaded into the upper flange 58 and has the tubular plug 61 near the upper end thereof. The tube 62 establishes tubular connection between the interior of the element K and the inlet 55 of the element J.

The float 63 normally rests on the lower flange 58 inside of the glass tube and has the stem 64 extending upwardly and part way into the hollow of the tube 60. The upper end of the stem normally supports the ball 65 which is loosely guided in the tube 60 to permit gas to flow through the tube and past the ball. The valve seat, suitable to the ball 65, is provided in the plug 61 and the ball is spaced from this valve seat when the float rests on the flange.

The tube 50 establishes tubular connection between the interior of the element K and the outlet 51 of the last one of the elements G and may have the check valve 66 therein to prevent the flow of substance from the element K back into the elements G.

The pressure gauge 67 is mounted in the front wall of the cabinet so that the face thereof is visible from the outside of the cabinet and is tubularly connected with the interior of the element K by the tube 68 so that the pressure in the element K can always be ascertained without opening the cabinet or otherwise manipulating or disturbing the apparatus.

The pressure gauge 69 is mounted in the front wall of the cabinet so that the face thereof is visible from the outside of the cabinet and is tubularly connected with the interior of the receptacle E by the tube 70 so that the pressure in the receptacle E can always be ascertained without opening the cabinet or otherwise manipulating or disturbing the apparatus.

The electric switch 71 is mounted in the front wall of the cabinet so that the same can be manipulated from the outside of the cabinet without opening the same or disturbing other parts of the apparatus and is inserted into one of the motor leads.

The spring 72 is located between the washer 24 and the top of the case 22 and is of such strength to partly collapse the cup 23 against the pressure in the receptacle E and thereby retain the switch blade 31 between the blades 32 and 33 and thereby keep the electric circuit closed so that the motor C will operate when the switch 71 is also closed and thereby operate the pump D to feed air into the receptacle E. When the pressure in the receptacle E rises above normal, air from the receptacle E being present also in the cup 23 through the tube 73, the cup expands lengthwise against the action of the spring 72 which is set for normal pressure and thereby moves the washer upwardly and, eventually, moves the blade 31 out of contact with the blades 32 and 33 and thereby breaks the motor circuit and automatically stops the operation of the motor and consequently the operation of the pump. When the pressure in the receptacle E falls below normal, the spring collapses the cup and moves the blade 31 into contact with the blades 32 and 33 and thereby closes the motor circuit and automatically starts the operation of the motor and consequently of the pump to bring the pressure in the receptacle E up to normal at which stage the operation of the motor and the pump is again automatically stopped as soon as the pressure in the receptacle E rises above normal.

By means of the collapsible cup I eliminate leakage through the element F as well as stuffing boxes or other sealing means which require adjustment and which have an uncertain frictional engagement with the moving stem or rod and thereby do not leave the spring free to act with a certain pressure under various adjustments of the sealing means. The cup leaves the spring free to always act with the same force, unhampered by any frictional disadvantage, to maintain a certain pressure in the receptacle E at all times.

The baffle means L, composed of a porous mass such as gravel or slag, is placed in each of the elements G and the tubes 47 extend through the baffle means and nearly to the bottom of the elements G where they may have a screen if desired.

Notation is made here that the elements G are not intended to have any body of liquid therein and that the liquid is intended to be suspended in the baffle means in the form of moisture and is fed into or onto the baffle means from the top, preferably drop by drop, so that it can trickle down through the baffle means and not be drawn into the same nor have the baffle means immersed in the liquid.

While the motor circuit is closed by the element F, the electro-magnet 39 is energized by the coil thereon in series with the motor and attracts the armature and thereby swivels the lever 40 on the pivot thereof and thereby moves the chain 44 and rotates the sprocket 42 and the rotatable member in the cock 43 and thereby opens the cock to permit gasolene to flow through the tube 17 and into the elements G. When the motor circuit is opened by the element F, the electro-magnet is de-magnetized and the weight 45 rotates the sprocket and the rotatable member of the cock and thereby closes the same and prevents liquid from flowing into the elements G through the tube 17. With this arrangement, the flow of gasolene into the elements G is automatically started and stopped as the motor is automatically started and stopped.

Normally, the carbureted mixture enters the element K through the tube 50 and leaves through the tube 60, flows past the ball 65, through the tube 55 and into the element J. When, for any reason or cause, gasolene in liquid body form is forced through the elements, it must enter the element K before it can reach the element J. When gasolene so enters the element K, the float therein rises and moves the ball upwardly and against the valve seat and thereby closes the opening for the tube 55 and prevents any gasolene from entering the element J and thereby prevents all possible danger of discharging anything but carbureted mixture from the tube 56. When the absence of discharge from the tube 56 is noted, it is known at once and then and there that something is wrong in the apparatus so that inspection or adjustment can be made. Upon draining the liquid from the element K through the faucet 59 and after adjustment is made, the apparatus is again in operable condition.

The pressure reducing valve 37 is adjustable so that a pressure different than the pressure in the receptacle E can be established and maintained in the elements G. For instance, I may normally carry a pressure of thirty pounds in the receptacle E and a pressure of nine pounds in the receptacle G.

Each of the receptacles I can be adjusted individually by means of the handles 54 thereof so that any desired quantity of gasolene can be fed into the elements G individually. I prefer to adjust the element I so that the gasolene is fed into the elements G drop by drop. The individual adjustment of each of the elements I permits each to be adjusted so that the required drops are delivered into each of the elements G. For instance, I may adjust the first element I to deliver fifty drops of gasolene into the first element G, forty drops into the second one, thirty drops into the third one, and twenty drops into the fourth one in a given period of time as may be needed in a particular composition of the resulting mixture. Other proportions of feed can be effected by this individual adjustment to vary the composition of the resulting mixture in a wide degree.

When air under pressure is existent in the receptacle E, some of it flows into the receptacle B through the tube 15 and whatever air is present in the receptacle B is prevented from flowing back into the receptacle E by the check valve 16 so that a practically even pressure is maintained in the receptacle B even when the pressure in the receptacle E falls below normal. This pressure in the receptacle B tends to force gasolene out of the same through the tube 15 and into all of the elements I when the cock 43 is open.

Some of this air under pressure in the receptacle E also flows through the tube 36 and into the pressure reducing valve 37 where the pressure thereof is reduced to any desired degree by the adjustability thereof, from there flows into the inlet channel 49 of the head H and through the first one of the tubes 47, discharges into the bottom of the first one of the containers G, rises therein and through the baffle means therein, flows into and through the second one of the tubes 47 through the first one of the channels 48 and discharges into the bottom of the second one of the containers G, rises therein and through the baffle means therein, flows into and through the third one of the tubes 47 through the second one of the channels 48 and discharges into the bottom of the third one of the containers G, rises therein and through the baffle means therein, flows into and through the fourth one of the tubes 47 through the third one of the channels 48 and discharges into the bottom of the fourth one of the containers G, rises therein and through the baffle means therein and discharges into the element K through the outlet 51 and the tube 50.

While the air is so traveling through the baffle means upwardly, the gasolene in each of the elements G is traveling downwardly primarily by gravity, both movements being primarily opposite, the gasolene being suspended in or on the baffle means without a body of gasolene being formed in the elements G, this air contacts the moist baffle means and absorbs the gasolene suspended therein or thereon and thereby forms a mixture in the nature of a gas. This operation continues and the final mixture is discharged through the tube 56.

Due to the adjustability of the elements I, each of the elements G can be supplied individually with just sufficient gasolene to add any proportion of gasolene constituents to the gas in each of the elements G.

In view of the foregoing, the present invention forms a final mixture by moving carburation liquid and carburation gas in opposition to each other; the carburation liquid is suspended and is not present in body form in the carburation elements; the apparatus as a whole has adequate safety devices to prevent danger as well as inefficient operation; the apparatus is entirely automatic in operation so that it requires very little attention; the carburation elements are completely inclosed to prevent tampering with them; and the gauges and manually operated switch are on the outside of the cabinet where the gauges can be seen and the switch can be operated without opening the cabinet.

Since I am aware that my invention is applicable to apparatuses other than the one shown and described and that changes and modifications can be made in the structure and in the arrangement shown and described, I do not limit myself to the precise application and structure and arrangement shown and described; therefore, without limiting myself to the precise application and structure and arrangement shown and described,

I claim:—

1. A carburation apparatus including a container having a mixture outlet means and baffle means therein, means to feed carburation liquid and carburation gas under pressure into said container to form a gaseous mixture, and a shut off means in said outlet means operated by carburation liquid therein to close the outlet to prevent carburation liquid from finally leaving said outlet means.

2. A carburation apparatus including a container having a mixture outlet means and baffle means therein, means to feed carburation liquid and carburation gas under pressure into said container to form a gaseous mixture, a valve means to regulate the flow of carburation liquid into said container to vary the composition, and a shut off means in said outlet means operated by carburation liquid therein to close the outlet to prevent carburation liquid from finally leaving said outlet means.

In testimony of the foregoing I affix my signature.

JOHN CARR.